United States Patent [19]
Weingarten

[11] 3,861,848
[45] Jan. 21, 1975

[54] EXTRUSION APPARATUS FOR PRODUCING LARGE SCALE PRODUCTS

[76] Inventor: Joseph L. Weingarten, 1427 Oak Tree Dr., Kettering, Ohio 45440

[22] Filed: Mar. 26, 1973

[21] Appl. No.: 344,789

[52] U.S. Cl.................. 425/378, 425/244, 264/177
[51] Int. Cl........... B29f 3/02, B29f 3/06, B29f 3/08
[58] Field of Search .......... 425/145, 207, 244, 376, 425/378; 264/177

[56] References Cited
UNITED STATES PATENTS

| | | | |
|---|---|---|---|
| 2,478,013 | 8/1949 | Roddy | 425/244 UX |
| 2,881,477 | 4/1959 | Triulzi | 425/145 |
| 3,127,637 | 4/1964 | Rex | 425/145 X |
| 3,256,568 | 6/1966 | Stenger | 425/244 X |
| 3,543,348 | 12/1970 | Nussbaum | 425/4 |
| 3,763,293 | 10/1973 | Nussbaum | 425/145 X |

FOREIGN PATENTS OR APPLICATIONS
392,059   9/1965   Switzerland.................... 425/244

Primary Examiner—R. Spencer Annear
Attorney, Agent, or Firm—Harry A. Herbert, Jr.; Arthur R. Parker

[57] ABSTRACT

Mechanism for extruding large cross-section articles consisting of a substantially conventional extruder and die arrangement combined with a series of accumulators interposed in communication between, and receiving and temporarily storing extrudant being pumped thereinto from the extruder at relatively low pressure for positioning the extrudant over a much wider die than normal. Hydraulically-operated rams force the extrudant from the accumulators into the die at relatively high pressure for its extrusion into a large scale item.

3 Claims, 9 Drawing Figures

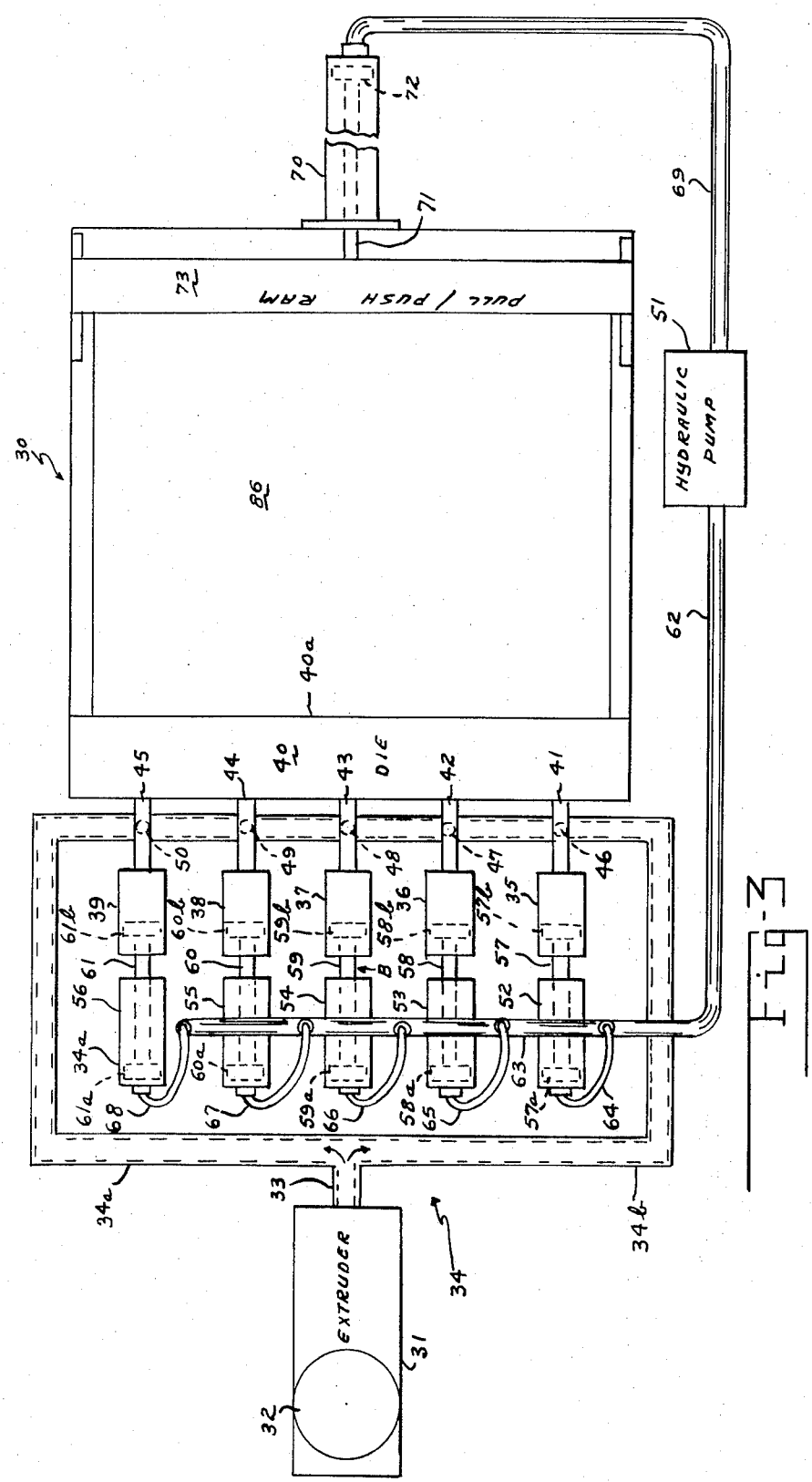

EXTRUSION APPARATUS FOR PRODUCING LARGE SCALE PRODUCTS

BACKGROUND OF THE INVENTION

This invention relates generally to extrusion apparatus and, in particular, to the extrusion of large scale articles.

In current practice, the extrusion process has been confined to the production of items of rather limited width or cross-section, since the size of the product to be extruded depends principally on the amount of material that can be pumped by the extrusion press. Thus, as a general rule, the larger the desired cross-section for the extruded article, the larger the equipment required therefor. Heretofore, the largest extrusion feasible by present techniques has been of a width or cross-section of 48 inches, requiring an extremely large extrusion press with a diameter of 12 inches.

In one effort to improve upon the rather limited size to which items may be currently extruded, a cast-extrusion process, similar to injection molding but on a much larger scale than normal, was tested in which a plastic core section for use in the manufacture of air cargo pallets was attempted to be produced. The mold used in this development was made of a size sufficient to make an extruded section 11 inches in width by 96 inches in length with the use of what is known as the Warren Truss design. Molten plastic, consisting of polypropylene reinforced with glass fibers for rigidity, strength and reduced thermal expansion, was forced into the said mold, which was heated, by an extruder that initially melted the plastic and then provided the necessary extrusion force. After filling the mold, the process was stopped, the mold and extruded matter therewithin allowed to cool, the mold disassembled, the finished item attempted to be removed therefrom, and the mold reassembled. However, due to length of the mold and the lack of fluidity in the plastic material, extremely high pressures were encountered at the extruder end which resulted in a shifting of the supporting core structure, at its unsupported places, making it more difficult to remove the finished product. In addition, when cooling in the mold, a shrink fit occured between the plastic material and the mold-core structure, actually causing sufficient warping in one instance to make it impossible to remove the extrusion therefrom. Finally, the aforementioned expanded injection molding technique involves considerable time and effort in the cooling of the extrusion, the disassembly of the mold and the removal of the extended product therefrom, and the reassembly and reheating of the mold in preparation for its next use. Therefore, to eliminate or at least drastically reduce the foregoing problems, the new and improved technique of the present invention, to be described hereinafter in the following summary and detailed description, was developed as a significant and more feasible extrusion means for producing large scale articles.

SUMMARY OF THE INVENTION

The present invention consists briefly in an apparatus and process for extruding large scale articles and in which a conventional-type extruder having a feed hopper for admitting plastic material thereinto melts and then pumps the melted plastic, at low pressure, into each of a series of accumulators aligned with each other and intermediately disposed between, and in communication with the extruder and a die member. This melted plastic or, in other words, extrudable material is pumped during this first stage or portion of a cycle of operation of the present apparatus until each accumulator is completely filled. In this manner, the extrudant is temporarily stored in the series of accumulators and thereby disposed over a much wider width than normal, making it possible and feasible to utilize a die of an extraordinarily large size/width. A hydraulically-operated ram for each accumulator is effective to thereafter pump or force the extrudant out of the exhaust outlet of each accumulator, at relatively high pressure, through communicating fluid passages into the rear of the die, where it is extruded over a relatively wide cross-section through numerous openings into a large scale finished product.

Other objects, features and built-in advantages of the invention will become self-evident hereinbelow in the following disclosure thereof, taken in connection with the accompanying drawings, in which:

BRIEF DESCRIPTION OF THE DRAWINGS

FIG. 3 is an overall assembly view, partly schematic and broken-away substantially illustrating the actual machine test set-up used to demonstrate the novel technique of the present invention in its preferred form in which a series of accumulators have been used to produce a large scale extrusion of the type used to form the core section of an air cargo pallet;

DESCRIPTION OF THE PREFERRED EMBODIMENT

Figure 1:
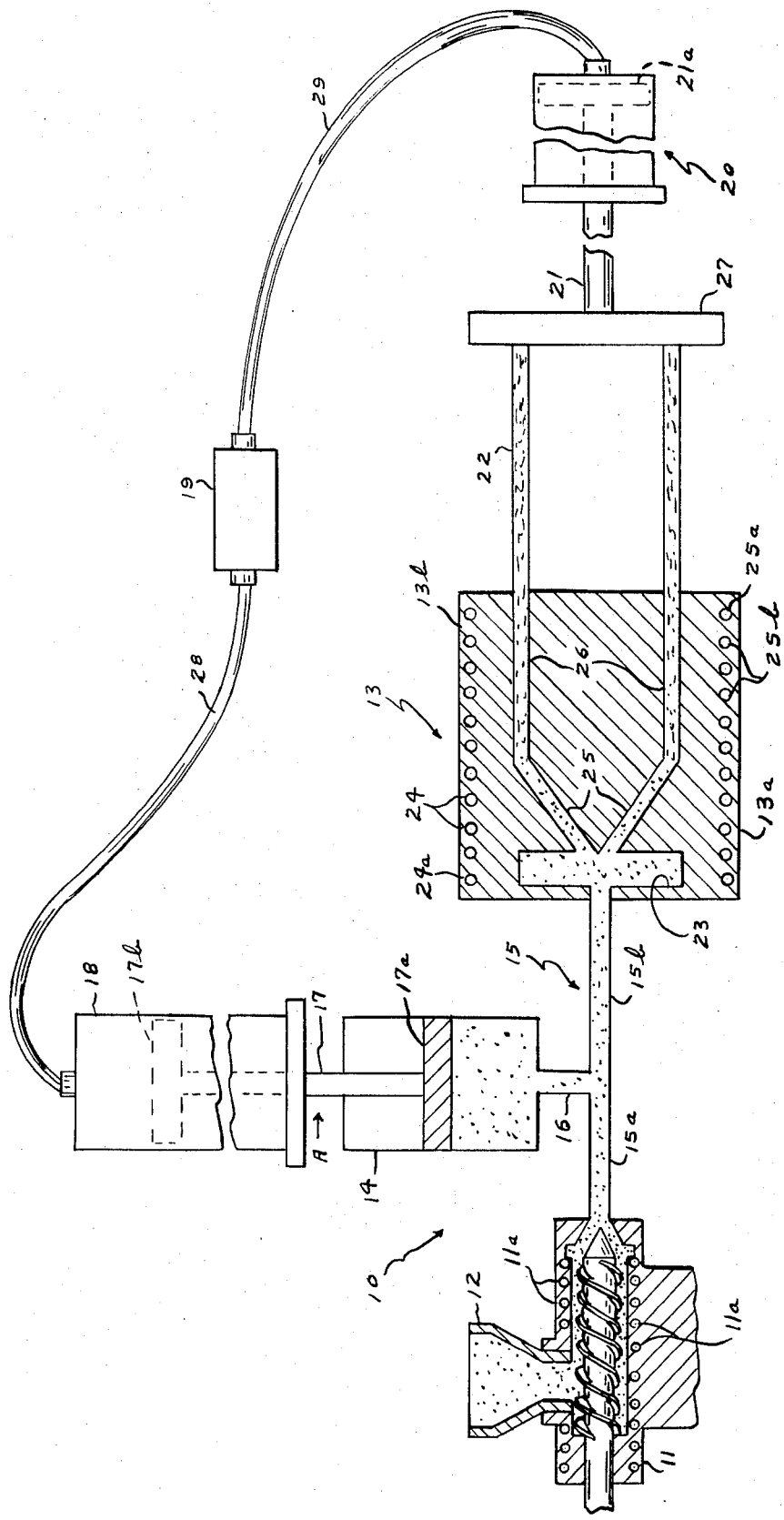
FIG. 1 is a schematic side view, partly broken-away, and in cross section, depicting a simplified arrangement of a machine set-up of the new and improved extrusion process and apparatus of the invention in which only one accumulator is being used.

Referring generally to the drawings and, in particular, to FIG. 1 thereof, the new and improved apparatus of the present invention is indicated generally at 10, in its most basic and simplified form, as comprising an extruder 11 with a feed hopper 12, a die member, indicated generally at 13 as incorporating a rear die section 13a and a forward or front die section 13b, and an accumulator in the form of the cylinder at 14, which accumulator 14 is, in accordance with the unique teaching of the present invention, interposed between, and in communication with the extruder 11 and die member 13. In this connection, it is noted that, in the usual extrusion apparatus, no such accumulator is used but, instead, the die member, as at 13, would be mounted directly on the fluid exhaust end of the extruder, as at 11, so that the extrudable material or extrudant would be pumped directly into the die member. In the case of the present invention, a significant improvement exists by the use of the aforesaid accumulator 14 in novel combination with and between substantially conventional extruder and die elements, as at 11 and 13. The accumulator 14 is also of a conventional design.

To initiate the extrusion operation of the present invention, extrudable material, such as a suitable plastic or polymer consisting, for example, of polypropylene reinforced with glass fibers for rigidity, strength and reduced thermal expansion, is introduced preferably in pellet form into the interior of the said extruder 11 through its feed hopper, at 12. The extruder 11 heats and melts the extrudant by means of heating coils, as at 11a, which may be built into the walls of the extruder, as shown, or otherwise mounted therearound and thermostatically controlled by any well-known means to the desired plastic flow temperature for the selected material of, for example, 490°F. Simultaneously with the said melting thereof, the extruder 11 is operative to pump the extrudant at a relatively low pressure of approximately 250 psi, for example, into the accumulator 14, which retains the extrudant at approximately the same 490°F. temperature as in the extruder 11, likewise, by any well-known thermostatically-controlled means (not shown) such as by the use of conventional heating pads disposed around the circumference thereof. The extrudant is temporarily stored in the accumulator 14 until the latter is completely filled. In this regard, it is noted that the extruder 11 may be either of a conventional screw-type, as is illustrated in the aforementioned FIG. 1, or it may be of the ram-type as a matter of choice.

The above-described pumping of the extrudant by the extruder 11 into the accumulator 14 before the actual extrusion thereof in the die member 13 constitutes the key feature and improvement of the present invention, as will be further emphasized hereinafter with specific reference to FIG. 3. To specifically provide for the transfer of the extrudant, first, into the accumulator 14 and then into the die member 13, a main feed line or pipe 15 extends between the outlet from the extruder 11 and a common extrudant-collecting chamber and/or passage 23 in the rear of the die member 13, and a branch or transfer feed line or pipe, at 16, is used to interconnect the main feed line or pipe 15 with the bottom of the said accumulator 14. Naturally, both feed and branch lines 15 and 16 may be suitably heated by conventional heating coils or otherwise to maintain the plastic flow of the molten material. Of course, during the very first pumping operation of the extruder 11, the extrudant does, in fact, initially fill the entire main feed line or pipe 15, the common extrudant-collecting chamber or passage 23 formed in the rear die section 13a and which is in communication with the feed line 15 and a first and second series of communicating extrusion passage, as at 25 and 26, formed respectively in the rear and forward or front die sections 13a and 13b.

The above-referred to initial filling of the main feed line 15, the common chamber 23, and the extrusion passages 25, 26 of the die member 13 naturally forms an initial extrusion at the front end of the die member 13. However, such an extrusion is obviously of a poor quality for the reason that it would have been formed at the low extrusion pressure of 250 psi at which the extrudant is being pumped by the extruder 11. Therefore, this initially extruded portion is considered as scrap and is subsequently separated from the finished product. However, this initially pumped extrudant performs the useful function of blocking the flow in the main feed line 15 forward of its connection to the branch line 16 and thereby positively directing the subsequent flow of extrudant upwardly through the said branch line 16 into the bottom of the accumulator 14. Of course, the initially pumped extrudant and extruded article formed thereby in the forward die section 13b must be captured and positively retained in position, and thus prevented from exiting from the front side of the die member 13.

The aforementioned prevention of the initially formed extrusion from leaving the die member is accomplished by the creation of a back pressure of, for example, approximately 350 psi, acting against the extruder-pumping pressure of 250 psi, through the action and operation of a ram member 21 forming part of a first, hydraulic cylinder assembly, indicated generally at 20 and which is powered by a conventional common hydraulic pump 19 through the interconnecting, first hydraulic fluid line 29 for thereby applying hydraulic fluid pressure against a first, relatively small piston element 21a slidably positioned in the said hydraulic cylinder. Hydraulic pump 19 is a common pump since it is also used to power the accumulator discharge portion of the cycle of operation of the invention through a second hydraulic fluid line 28 by means to be further described. The said ram member 21 incorporates a second, relatively enlarged piston element 27 constituting a pull/push ram element and mounted on its end opposite from the first piston element 21a and disposed outside of the cylinder 20. When the back pressure of 350 psi is being applied to the first piston element 21 a, it and the ram member 21 thereof, and the second, piston element 27 are moved to their left most position, as viewed in FIG. 1, until the said piston element 27 engages in a tight-fitting and substantially sealed relation against the forward side of the front die section 13b where it is operative to prevent the previously-described, initially-formed extrusion from existing from the die member 13, as previously-noted. In this manner, the previously-referred to positive direction of the molten plastic or extrudant being pumped by the extruder 11 upwardly through the branch line 16 into the accumulator 14 is assured.

The above-noted pumping of the extrudant upwardly through the branch line 16 continues until the accumulator 14 is completely filled. During this filling of the said accumulator 14 from the bottom, the rising level of molten plastic or extrudant acts upwardly against and is effective to drive the second, lower piston element 17a of the ram member 17 of a second, hydraulic cylinder assembly 18, mounted over the accumulator 14 with the said lower piston element 17a slidably engaged within the accumulator, upwardly to its uppermost or top position. A first, upper piston element 17b slidably positioned in the cylinder 18 and mounted on the opposite end of the ram member 17 completes the said second, hydraulic cylinder assembly 18. At this time, with a conventional limit switch (not shown), suitably positioned, as for example, at the area marked A, with its toggle arm placed in the path of, and being substantially engaged by the upward movement of the ram member 17 to thereby control a conventional solenoid-actuated, selector valve, as at 19a in FIG. 3a, for example, the back pressure-producing function and operation of the hydraulic pump 19 would be automatically shut off. Simultaneously therewith, the output from the said pump would be automatically shifted to its accumulator pressurization and discharge function in a manner and by means to be further described hereinbelow.

Figure 3A:
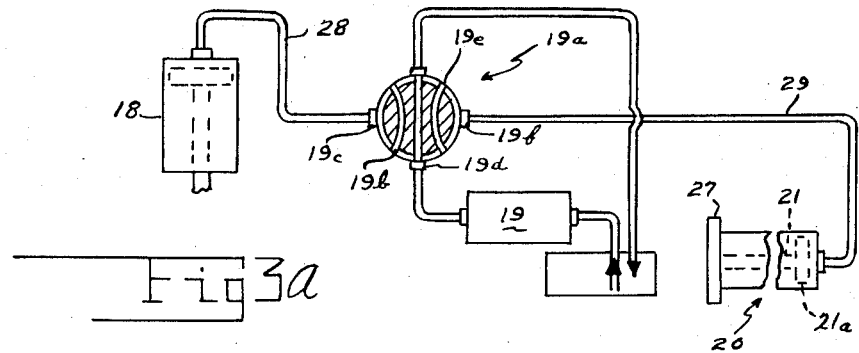
FIG. 3a is a somewhat schematic and partly broken-away view, showing further details of one type of hydraulic pump circuit utilizable with the assembly of either FIGS. 1 or 3.

When the foregoing adjustment of the solenoid-actuated, selector valve 19a of the aforementioned FIG. 3a occurs through the aforementioned upward engagement of the ram member 17 (FIG. 1) with a conventional limit switch in circuit with the aforesaid selector valve 19a, the latter, which is presently shown in its neutral position, is automatically rotated in a counterclockwise direction, for example, until the selector valve-fluid passage 19b thereof is placed in direct alignment and communication with and between the fluid taps at 19c and 19d. This automatically opens the second hydraulic fluid line 28 to the output from the hydraulic pump 19, and, at the same time, disconnects the selector valve-fluid passage, at 19e, from its previous communication between the fluid taps at 19d and 19f, thereby automatically stopping the back pressure-producing portion of the invention operation that has been previously provided by the application of hydraulic fluid pressure through the first, hydraulic line 29 to the piston element 21a of the first-named hydraulic cylinder assembly 20.

The previously-mentioned accumulator pressurization and discharge portion of the invention operation consists in the hydraulic pump 19 applying a relatively high pressure of, in one instance, 1,500 psi, through the hydraulic fluid line 28, downwardly against the top of the upper piston element 17b (FIG. 1) of the ram member 17 of the second, hydraulic cylinder assembly 18. The lower piston element 17a now resting in the top of the accumulator 14 is thereby also forced downwardly to thus pressurize and pump the extrudant contained and temporarily stored in the said accumulator out of the bottom thereof, at approximately the said relatively high pressure of 1,500 psi, through the branch line 16, and into the second, main feed line or pipe-portion 15b, from whence it is pumped into the rear die section 13a for its initial collection in the extrudant-collecting chamber 23 and subsequent extrusion out through the first and second series of communicating extrusion passages, indicated generally at 25 and 26 as being incorporated respectively in the rear and forward die sections 13a and 13b. The finished extrusion, which, in this instance, is a panel, is indicated generally at the reference numeral 22. In an actual test operation of the basic form of the invention of FIG. 1, a panel 22 inches in width was extruded.

To provide for the retention of the necessary fluidity of the molten plastic or extrudant as the latter enters the common extrudent-collecting chamber 23 in the rear of the die member 13, the rear die section 13a may also be maintained at approximately the same 490°F. temperature as in the extruder 11 by suitable thermostatically-controlled heating coils, as indicated generally at 24. Since it is necessary that the extrudant be cooled in order to form the finished extrusion, as at 22, cooling coils, likewise thermostatically controlled, are incorporated in the forward or front die section 13b, as indicated generally at 25b. Actually, to prevent the formation of a weld line, it is considered that, for best results, the extrudant should be gradually cooled from the hottest position in the rear die section 13b, at the first heating coil 24a, to the coldest position, at the last cooling coil 25a. Of course, by keeping the rear portion of the rear die section 13b and therefore the chamber 23 at about the same 490°F. temperature previously mentioned, a good mixing together and welding of extrudant being pumped thereinto, as is particularly the case of the more fully developed form of the invention of FIG. 3, which is to be further explained, is assured.

With specific reference to the above-referred to FIG. 3, the preferred and more fully developed form of the invention is indicated generally at 30 as including, again, an extruder 31 with a feed hopper 32 for introducing extrudable material thereinto. In an actual test of the more developed form of the invention, the extruder, as at 31, used was an Atena Standard extruder, with a 3½ inch diameter screw, 16 inches 1 L/D, and with hot oil heat and a 40 horsepower drive motor. Said extruder, as depicted schematically at the aforementioned reference numeral 31, melted and pumped the extrudable material from its exhaust or transfer feed line or pipe 33 through a main channel or feed line or pipe, indicated generally at 34 and which consists of a continuous channel, feed-line or pipe divided at its juncture with the transfer pipe 33 into left and right channel-branches, indicated respectively at 34a and 34b, for thereby simultaneously directing the extrudant being pumped by the extruder 31 in opposite directions around both sides and to the rear or underside of a series of accumulators or accumulator cylinders, in this instance totaling five in number and indicated respectively at 35, 36, 37, 38 and 39 and which are mounted along and substantially adjacent to the rear of an enlarged die member 40 that is made of a sufficient width to produce an extruded article, such as a panel of 101 inches in width and 2¼ inches in thickness. Said accumulators 35 to 39 are respectively interconnected at their bottoms, or right ends as viewed in FIG. 3, with the rear of the die member 40 by a main branch fluid line or pipe, depicted at 41, 42, 43, 44 and 45, whereas, that portion of the main channel 34 that is immediately behind or underneath the said accumulators may be interconnected and communicate with the said main branch fluid lines or pipes by means of a series of secondary branch lines or pipes, indicated respectively at 46, 47, 48, 49 and 50.

As in the case of the single accumulator form of the invention of FIG. 1, the initial pumping of the extruder 31, again, at the 250 psi, (FIG. 3) will cause the flow of the molten plastic or extrudant through the main channel 34 around both sides and to the rear of or underneath the accumulators 35 and 39 where it will initially enter a common, extrudant-collecting chamber formed in the rear of the die member 40 progressively through one or more of the secondary branch lines 46 to 50 and the main branch lines 41 to 45. This initial flow will continue until the extrusion passages in both rear and front portions of the die member 40, to be further described hereinbelow, and the said extrudant-collecting chamber in the rear of the die member, and the foregoing branch lines 41 to 50 have been filled to thereby positively direct all of the remaining flow of extrudant upwardly through the secondary branch lines 46 to 50, first, into the main branch lines 41 to 45, from whence it is pumped in a particular sequence into the bottom, or right end of the accumulators 35 to 39, as viewed in the aforementioned FIG. 3. In actual tests of the invention, the sequence of filling proved to be, first, the outermost pair of accumulators 35 and 39, then accumulators 36 and 38 and, finally, the centrally-disposed accumulator 37.

Mounted directly over, or further to left of each accumulator 35 to 39 as viewed in FIG. 3, and in accordance with the novel teaching of the preferred form of the invention, is a separate hydraulic cylinder, indicated generally and respectively at 52, 53, 54, 55 and 56. Each of the said hydraulic cylinders incorporates a ram member respectively indicated at 57, 58, 59, 60 and 61, which ram members each further incorporates oppositely-disposed, left and right-end piston elements respectively depicted at 57a and 57b, 58a and 58b, 59a and 59b, 60a and 60b, and 61a and 61b. A common hydraulic pump, indicated generally and schematically at 51, is operative through a common hydraulic fluid line at 62, to power each of the aforementioned ram members 57 to 61 by way of a common and elongated header pipe, at 63, and a series of relatively short, preferably flexible hydraulic tubes, at 64, 65, 66, 67 and 68, that are respectively interconnected at spaced intervals between the common header pipe and the top, or left end of each hydraulic cylinder.

The hydraulic pump 51 is referred to as a "common" hydraulic pump because, in a manner similar to the hydraulic pump 19 of FIG. 1, it is also operative to provide the same back pressure of about 350 psi, through the hydraulic fluid line 69 extending between the pump 51 and the hydraulic cylinder 70 of a back pressure-producing ram member 71 having on one end thereof a relatively small piston element 72 slidably positioned in said cylinder 70 and to the opposite end thereof a relatively enlarged piston-type push/pull ram element 73. The ram element 73 is adjusted to its left-most position in tight-fitting abutment against the forward or front side 40a of the die member 40 to thereby retain the initially forward extrusion therewithin with the aforementioned back pressure of 350 psi. This is of course accomplished again as in the case of FIG. 1, by the appropriate adjustment of a solenoid-actuated selector valve, as previously described at the reference numeral 19a in FIG. 3a. In this regard, as each of the accumulators 35 to 39 is filled in the sequence previously described, the rising extrudant automatically acts against and drives the particular lower or right hand-piston elements 57b to 61b in the upper or left direction to thereby simultaneously relocate each of their upper or left hand-piston elements 57a to 61a in the accumulator-extrudant pressurization and discharging position adjacent to their left ends. Of course, a conventional-type limit switch (not shown) controlling the solenoid actuated-selector valve 19a would be suitably positioned, as for example, at the approximate area marked B, so that its toggle switch would be engaged and operated by the final portion of the upper movement or movement to the left, of the centrally-disposed ram member 59, which would be achieved upon the complete filling of the accumulator 37. This operation of the limit switch, in a manner identical to that of FIG. 1, automatically shifts the selector valve 19a, again, in a counterclockwise direction to bring the fluid passage 19b thereof in communicating alignment between the fluid tops at 19c and 19d, thereby cutting off the output of the hydraulic pump 19 to the back pressure-producing hydraulic line 29, and transferring this output to each of the hydraulic cylinders 52 to 56 by way of the common hydraulic line 62 (Note FIG. 3), the common header pipe 63 and each of the interconnecting flexible tubes, at 64 to 68 respectively. This latter action is effective to pressurize each hydraulic cylinder, 52 to 56, as in the basic form of the invention of FIG. 1, to 1,500 psi to thereby simultaneously pump, through the operation of the ram members 57 to 61 and their respective piston elements mounted in the accumulators 35 to 39, the extrudant from each of the said accumulators through the previously-described main branch lines 41 to 45 into the rear of the die member 40, a representative example of which being indicated in detail generally at 74 in FIG. 5.

Figure 5:
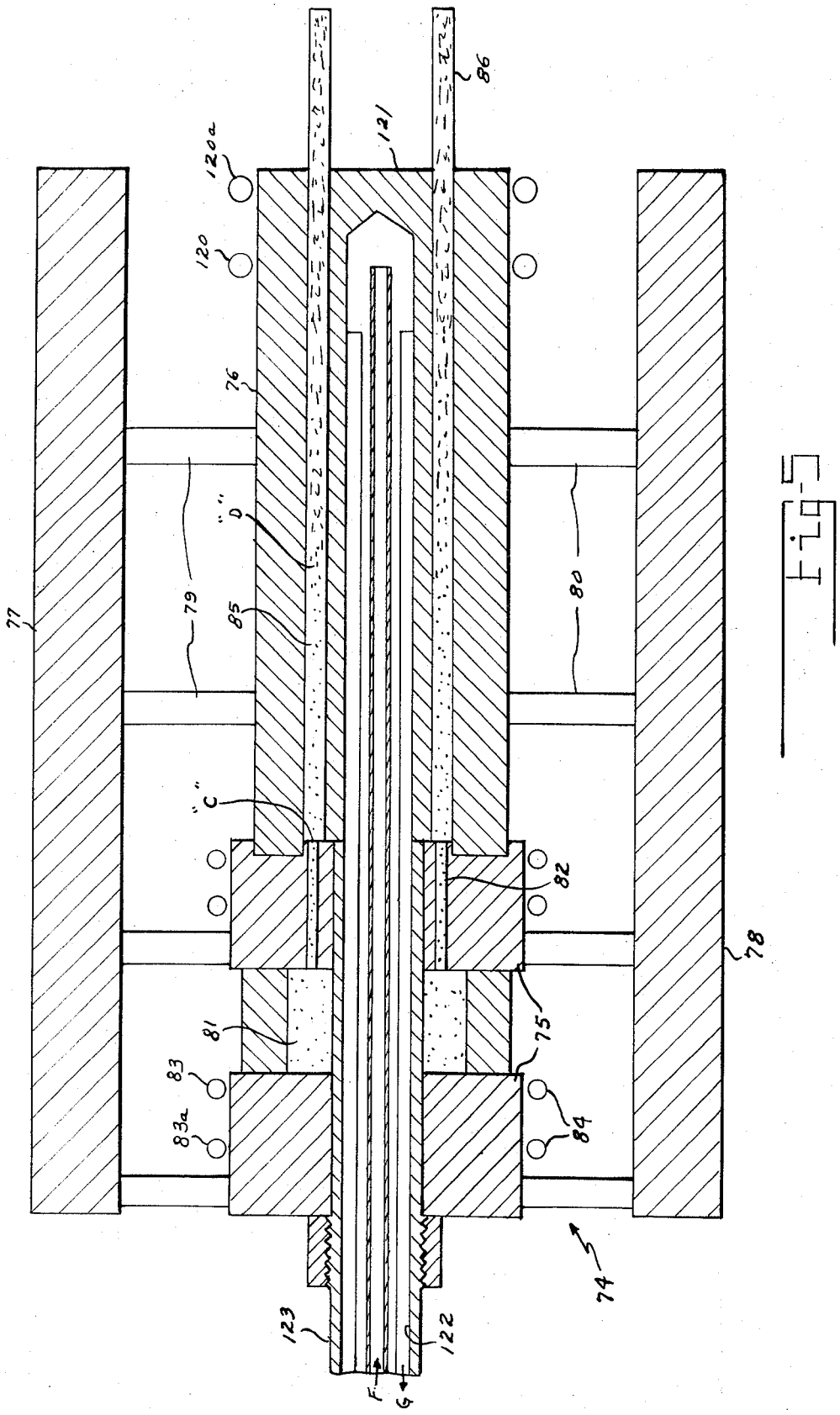
FIG. 5 is an enlarged cross-sectional and partly broken-away view, illustrating details of one form of die member that may be used with the invention.

Referring particularly to the aforementioned FIG. 5, it is clearly seen that the die member 74 comprises a rear heated die section 75, a front cooled die section 76, and a pair of oppositely-disposed plate supports, 77 and 78, for supporting the die member 74 therebetween through the use of a plurality of bolts, at 79 and 80, attached in opposite relation thereto. The rear heated die section 75 incorporates a common, extrudant-collecting chamber or passage 81, similar to that indicated at 23 in FIG. 1, and, because of the use of the five (5) accumulators 35 to 39 (FIG. 3), the molten plastic or extrudant enters into said extrudant-collecting chamber 81 through five (5) entry openings disposed over an unusually wide cross-sectional area. From the said collecting chamber 81, the extrudant is immediately thereafter pumped, by the aforementioned hydraulic operation of the ram members 57 to 61 and associated piston elements disposed within each accumulator, at the said 1,500 psi pressure, and thereby extruded through a first series of extrusion openings or passages, indicated generally at 82 as being formed in the rear, heated die section 75 and which are in obvious communication with the said chamber 81. Up to this point in the operation of the invention extrusion technique, the extrudant has been maintained in the molten plastic state at a temperature of approximately 490°F, as it was when melted in the extruder 31 (FIG. 3). In this manner, a good welding together or, in other words, the fusion of all the extrudant being pumped into the collecting chamber 81 through the five main openings is assured. For this purpose, again, thermostatically-controlled heating coils, as at 83 and 84 may be incorporated in the rear, heated die section 75.

Figure 2:
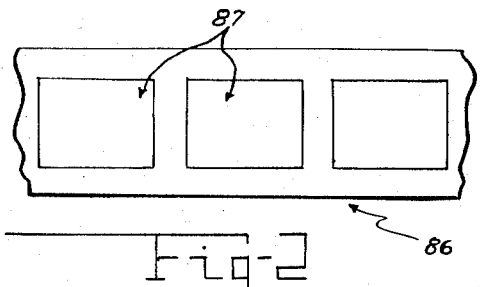
FIGS. 2, 2a, 2b and 2c depict in schematic and/or partly broken-away manner several representative examples of alternate cross-sectional forms that may be extruded with equal facility by the present extrusion process and apparatus.
Figure 2A:
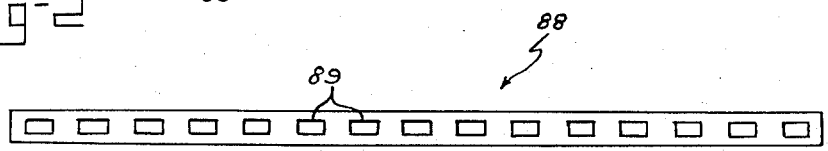

When the extrudant reaches the juncture, indicated generally at C, between the previously-noted first series of extrusion passages, as at 82 formed in the rear heated die section 75, and a second series of extrusion openings, or passages indicated generally at 85, and exactly corresponding to and in communication therewith, it is still in the plastic form. However, as the said extrudant continues its extrusion through the said second series of passages 85, which are disposed in and extend through the front, cooled die section 76, it begins to cool and gradually harden, starting at about the position D, until it has completely formed into the finished extruded product at the forward or front side of the die member 77. In the example depicted in the aforementioned FIG. 5, a panel, as at 86, representing the center section of an air cargo pallet and having an extremely large cross-section of 101 inches and 2¼ inches in thickness, was extruded by the inventive arrangement incorporating the plurality of accumulators 35 to 39 in unique combination with, and between the extruder 31 and die member 86, and disposed along the rear of the latter. A fragmentary view of such a panel 86 is depicted in more detail in FIG. 2. As seen particularly in the latter figure, the extruded panel actually produced by the inventive method incorporated a plurality of 50 internal core sections, as indicated generally at 87, which, of course, provide for a substantial reduction in the overall weight thereof. In the cross-section of FIG. 5, one of the said internal cores is indicated at 121. However, it is to be understood that the specific configuration of the die member 40 per se is unimportant to the present invention. For instance, it could just easily be designed to produce an extruded panel, as at 88 in FIG. 2a, that incorporates only 22 core sections, at 89, and with a decreased thickness, or, alternatively, the arcuate-shaped products 90 and 91 of FIG. 2b and 2c could be extruded by the improved means of the present invention with great facility and merely by changing the die member.

Figure 2C:
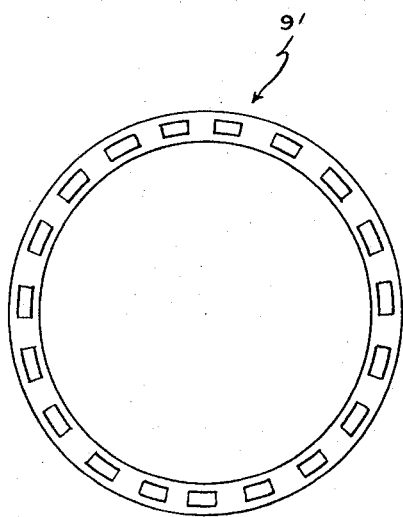
Figure 2B:
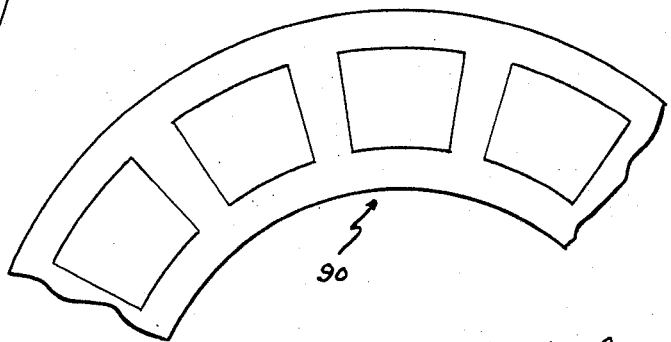
Figure 4:
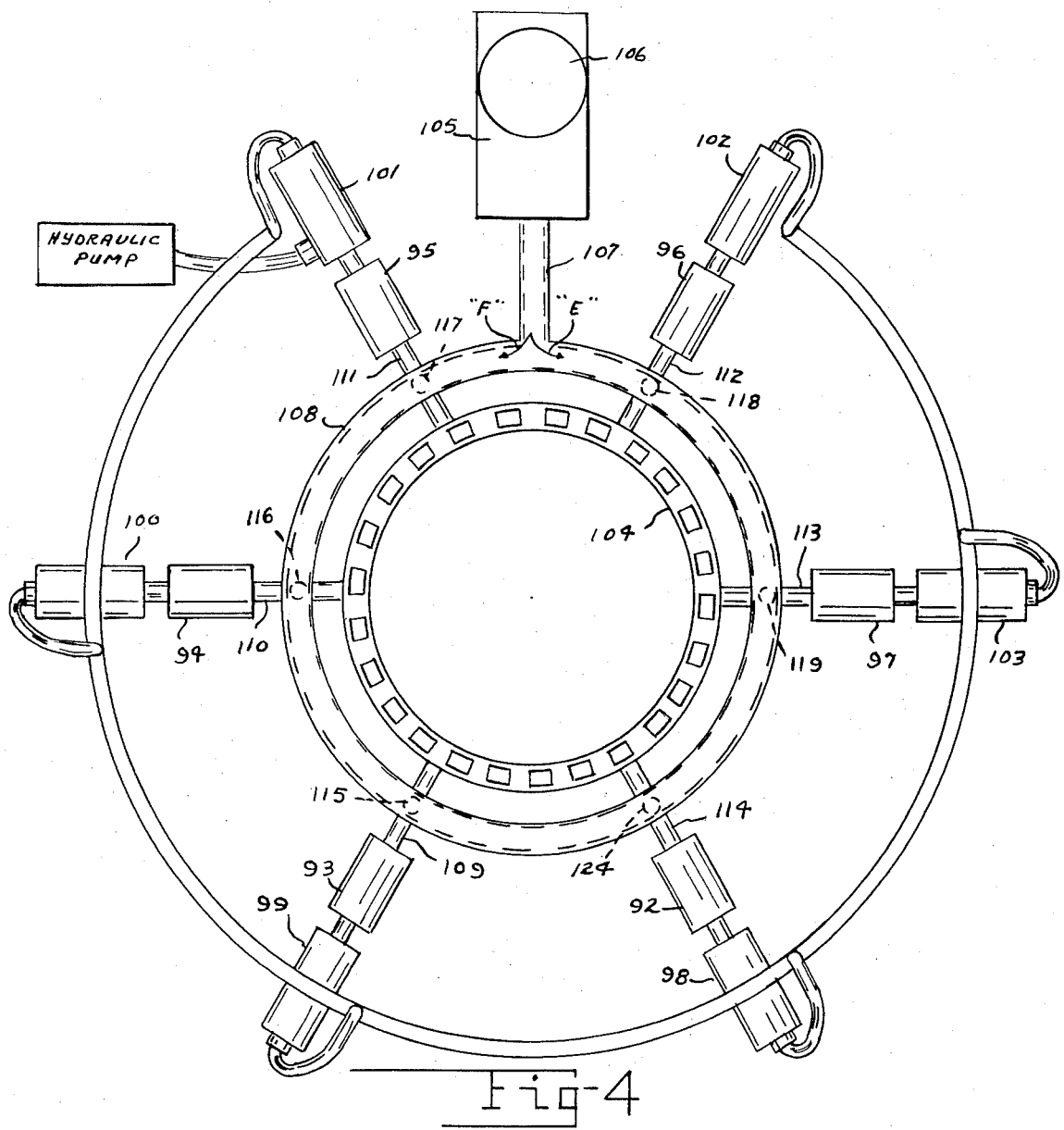
FIG. 4 is another schematic and assembly view, depicting the new and improved extrusion technique of the present invention as it may be applied to produce a large scale extruded pipe.

In further regard to the extruded configuration of FIG. 2c, the form depicted at the aforementioned reference numeral 91 could represent an enlarged pipe formed by a slight modification of the inventive configuration of FIG. 3, and illustrated in somewhat schematic and more detailed form in FIG. 4. In the latter figure, the accumulators, at 92 to 97 and the hydraulic cylinders at 98 to 103 have been disposed in a circular configuration around the die member, indicated generally at 104. With this arrangement, again, extrudant admitted into the extruder at 105, through the feed hopper 106, is pumped through the exhaust outlet pipe 107 into the main, arcuate-shaped channel 108, where it divides into two flows, indicated at E and F, from whence it is sequentially directed by way of the secondary branch lines 115 to 119 and 124 extending from the main channel 108 into the main branch lines of each accumulator, which main branch lines are respectively indicated at 109, 110 111, 112, 113 and 114 as being disposed between the bottoms of a respective accumulator and the rear of the die member 104. Thereafter, the said extrudant would be fed directly into the bottom of the accumulator corresponding thereto. Of course, as in the case of the inventive forms of FIGS. 1 and 3, during the initial portion of the extruder-pumping operation, and before the filling of the accumulators 92 to 97, extrudant would enter the die member 104, through the appropriate branch lines 115 to 119 and 124 and 109 to 114 until these lines and the common extrudant-collecting chamber and extrusion passages have been completely filled. Again, this would require that an appropriate back pressure be produced against the exit openings of their extrusion passages by some hydraulically-operated ram arrangement, similar to that previously-noted for the push/pull ram element 73 of FIG. 3, for example, but, of course, of a circular configuration. The remaining part of the extrusion means of FIG. 4 would be identical to that hereinbefore described.

Again referring to FIG. 5, the die member 74 thereof and, in particular, its front die section 76 would be cooled by means of coils or lines, indicated generally at 120. In the manner previously-mentioned in specific connection with FIGS. 1 and 3, the most difficient and effective extrusion would result from a gradual lowering of the temperature from the highest temperature of approximately 490°F, for example, at the first heating coil, as at 83a, to the coldest temperature at the last cooling coil or line, as at 120a. As noted hereinabove, by maintaining the extrudent in its molten form and under pressure when it enters the rear of the die member, as at 74, complete fusion of the extrudent is specifically ensured.

To provide for the further controlled and gradual cooling of each of the internal core sections, as at 121 (FIG. 5), coolant, such as water, may be pumped through a central passage portion F of a coolant-supply pipe at 122 extending from the rear die section 75 through the front die section 76. The return of the coolant is through the outer passage indicated at G. However, since it is desired to actually cool only that portion of each core section, as at 121, that is positioned in the front cooled die section 76, a teflon insert, at 123, is mounted within the rear section of the said internal core 121. The previously-described cooling lines, at 120a, are used to specifically provide for the requisite cooling at the exit from the die member 74.

During actual tests of the present invention, after the accumulators, as at 35 to 39 in FIG. 3, had been completely emptied, the molten plastic was allowed to cool under pressure in the die member 40 for 4¾ minutes, during which time, the next filling portion of the cycle of operation of the said accumulators occured. Of course, simultaneous with this filling step, the limit switch controlling the selector valve 19a (FIG. 3a) was again activated but in the reverse direction by the completion of the extrudant-pressurization and pumping stroke of each of the several hydraulic cylinders, as at 52 to 56, and, in particular, that of the central hydraulic cylinder-ram 59, to thereby automatically cut-off the power from the hydraulic pump 51 to the said cylinders by way of the hydraulic fluid line 62. Thus, the back pressure produced by the hydraulically-operated, piston-type of pull/push ram element 73 was sufficient to still hold the extrusion in the die member 40 until the next pressurization stroke occurs. Once again, on completion of the next accumulator-filling portion of the invention operation, the centrally-mounted hydraulic cylinder-ram 59 becomes automatically effective, on engagement with the conventional limit switch at A to repeat the extrudant-pressurization and pumping stroke, by the operation of the previously-described plurality of hydraulic rams to thereby pump, at high pressure, another supply of extrudant into the rear of the die member, at 40, for its final extrusion in finished form.

The piston-type, pull/push ram element 73 may also incorporate a channel configuration forming a recess on its side nearest the die member 40 for thereby receiving the leading edge of the extrusion, as at 86, within the said recess and, in conjunction with the use of standard screw-type of upper and lower bolts, act as a clamping device for securing the extruded part thereto. By this technique, a positive guide and control means is provided for the item being extruded from the die member, as at 40. However, any suitable means could be used for this purpose, as for example, a pair of brake shoes, or friction rollers mounted on the top and bottom of the extruded item at a predetermined spacing specifically related to the particular die member configuration being used to thereby provide a snug fit therebetween for the extrusion exiting from the die member. In any event, the specific details of such retardation device are unimportant to the present invention and are therefore not further disclosed herein.

Thus, a new and improved extrusion means has been developed by the present invention whereby extremely large cross-section extrusions are now producable through the simple modification of a conventional extrusion apparatus by placing a series of accumulators, acting as temporary holding tanks, along and in communication with the rear of an enlarged die, and between the extruder and die. Extrudant, initially pumped at low pressure from the extruder into the accumulators, is thereafter pumped at high pressure into, and at all locations along the rear of the enlarged die by a separate hydraulically-operated ram for each accumulator, thereby enabling and assuring the extrusion of large scale articles.

Since each of the previously-described hydraulically-operated ram and accumulator assemblies, in effect, act as a separate extruder, in a somewhat modified application of, and obviously falling within the scope of the present invention, each accumulator could be equipped with its own, separate extruder, if desired, to replace the hydraulic ram thereof to supply the requisite pumping of extrudant into the rear of the die member.

I claim:

1. Apparatus for extruding large cross-section articles, comprising; heated extruder means for melting and initially pumping extrudant at a predetermined temperature compatible with the plastic flow thereof, and at a relatively low pressure; an extrusion die member enlarged to an extremely large scale and greatly expanded width-extrusion producing capability, and incorporating a rear heated die section having a relatively elongated, main, common, extrudant-collecting chamber in open communication with a plurality of extrudent-admitting, entrance passages open at, and evenly distributed over the rear end of said die member; a first series of relatively short extrusion passages in communication with, and extending forwardly of said collecting chamber and utilizable to transfer the extrudant forwardly in a molten state, and a second series of relatively elongated, extrusion passages communicating with the forward ends of said first-named series of passages for gradually cooling and thereby hardening the extrudant into the finished product, as it is transferred thereby further forwardly to and out of the forward or front side of said die member; a separate, heated, temporary extrudant-storage means disposed in spaced relation from the rear of the die member and in direct alignment with the open rear end of an extrudant-admitting, entrance passage corresponding thereto; an extrudant-exhaust outlet pipe extending from said extruder means; a main, common, extrudant-feed line in open communication with and receiving extrudant being pumped at relatively low pressure from said extruder means; a first series of extrudant transferring-branch lines respectively disposed between one end of each of said temporary extrudant-storage means, in communication with the interior thereof, and an extrudant-admitting, entrance passage of said rear die section corresponding thereto; a second series of extrudant transferring-branch lines respectively interconnected between said main, common extrudant-feed line and a selected one of said first series of branch lines corresponding thereto; said extruder means initially pumping molten extrudant at relatively low pressure through and completely filling said main, common, extrudant-feed line, and each of said first and second series of extrudant transferring-branch lines, the first series of entrance passages incorporated in said rear die section, the main, common, extrudant-collecting chamber thereof and the second series of extrusion cooling and hardening-passages; back pressure-producing means adjustably positioned to a first, rearwardmost location in blocking position against, and preventing further movement to the front of the gradually hardening extrudant being initially pumped at relatively low pressure by said extruder means into said second series of extrudant transferring-branch lines; and separate power-actuated means interconnected with and utilizable for each of said separate, temporary extrudant-storage means for thereby pressurizing and pumping the extrudant contained therewithin into the main, common collecting chamber at the rear of the die member, through the said first and second series of branch lines and entrance passages, and thereafter into the said second series of extrusion-cooling and hardening passageways, at a relatively high pressure sufficient to counteract the blocking effect of said back pressure-producing means for its subsequent extrusion into a relatively large scale item at the front of said die member.

2. In apparatus for extruding large cross-section articles as in claim 1, wherein said temporary extrudant-storage means comprises a plurality of accumulators in the form of cylinders; and said power-actuated means comprises a separate hydraulically-operated ram interconnected with each of said accumulator cylinders at its end remote from the branch line connected thereto; and a common, hydraulic pump in fluid line-communication with, and thus operating each of said rams for thereby initially compressing and pressurizing relatively low pressure-extrudant, previously transferred into each accumulator by the operation of said extruder means, at the said relatively high pressure, and subsequently pumping said relatively high pressure-extrudant into the rear, main collecting chamber of the said enlarged die member for its final extrusion into the large scale product.

3. Apparatus for extruding large cross-section articles, comprising; heated extruder means for melting and initially pumping extrudant at a predetermined temperature compatible with the plastic flow thereof, and at a relatively low pressure; a die member communicating with said heated extruder means and enlarged to an extremely large scale-extrusion producing capability; heated, temporary extrudant-storage means comprising a series of cylindrical accumulators disposed along, and each having a branch line in communication at periodic intervals between the rear of the die member and said heated extruder means for collecting and being filled with the initially pumped, low pressure-extrudant prior to its being pumped into the rear of the said die member; power-actuated means comprising a plurality of separate, hydraulically-operated rams each respectively interconnected with a corresponding one of the said series of cylindrical accumulators constituting the said temporary extrudant-storage means, and further incorporating a common, hydraulic pump in fluid line-communication with and thereby operative to pressurize and pump the extrudant contained therewithin at a relatively high pressure into the rear of the die member for its subsequent extrusion into a relatively large scale item; and a pull/push hydraulic ram assembly for creating a back pressure against, and holding the extrusion in said die member until said accumulators have been filled; said assembly comprising; a hydraulic cylinder positioned at or adjacent the front portion of said die member and interconnected with, and operable by said common hydraulic pump through a hydraulic fluid feed line; and a ram slidably positioned relative to said cylinder, and incorporating a first relatively small piston element disposed within said cylinder and directly acted upon by the hydraulic fluid-compressing operation of said hydraulic pump; and a second, relatively enlarged, piston element oppositely disposed from said first-named piston element outside of said cylinder and constituting the pull/push ram element of the assembly; said pull/push ram element being actuated by the back pressure-producing operation of the said hydraulic pump to its extended position relative to said cylinder in abutting and substantially sealed relation against the front side of the die member to thereby temporarily retain the extrusion therein.

* * * * *